United States Patent
Koch et al.

(10) Patent No.: US 7,824,130 B2
(45) Date of Patent: Nov. 2, 2010

(54) APPARATUS AND METHOD FOR JOINING A PIPE CONDUIT TO A DRILLING DEVICE, EXPANDING DEVICE OR PULL-IN DEVICE

(75) Inventors: Elmar Koch, Eslohe (DE); Martin Köper, Attendorn (DE)

(73) Assignee: Tracto-Technik GmbH, Lennestadt (DE)

( * ) Notice: Subject to any disclaimer, the term of this patent is extended or adjusted under 35 U.S.C. 154(b) by 697 days.

(21) Appl. No.: 11/572,856

(22) PCT Filed: Jul. 20, 2005

(86) PCT No.: PCT/EP2005/007913
§ 371 (c)(1),
(2), (4) Date: Jan. 29, 2007

(87) PCT Pub. No.: WO2006/010549
PCT Pub. Date: Feb. 2, 2006

(65) Prior Publication Data
US 2007/0284149 A1     Dec. 13, 2007

(30) Foreign Application Priority Data
Jul. 27, 2004  (DE) ................. 10 2004 036 425

(51) Int. Cl.
*F16L 55/18* (2006.01)
(52) U.S. Cl. ............. 405/184.3; 405/184.1; 405/184; 138/97
(58) Field of Classification Search .......... 405/184, 405/184.1, 184.2, 184.3; 138/97
See application file for complete search history.

(56) References Cited

U.S. PATENT DOCUMENTS

| | | | | |
|---|---|---|---|---|
| 4,297,055 A | * | 10/1981 | Peacock | 405/184 |
| 4,507,019 A | * | 3/1985 | Thompson | 405/184.3 |
| 4,529,008 A | * | 7/1985 | Appleton | 405/184.1 |
| 4,657,436 A | * | 4/1987 | Yarnell | 405/184.2 |
| 4,674,914 A | * | 6/1987 | Wayman et al. | 405/184.3 |
| 4,694,913 A | | 9/1987 | McDonald et al. | |

(Continued)

FOREIGN PATENT DOCUMENTS

DE    38 01 824    7/1989

(Continued)

OTHER PUBLICATIONS

Terra—"Systeme zur grabenlosen Rohrverlegung" [*Systems for Trenchless Pipelinstallation*], Terra Hammer—Systeme zur Rohrsplittung, pp. 1-4.

(Continued)

*Primary Examiner*—Frederick L Lagman
(74) *Attorney, Agent, or Firm*—Henry M. Feiereisen; Ursula B. Day

(57) ABSTRACT

The invention relates to an apparatus and a method for joining a pipe conduit to a drilling device, expanding device or pull-in device, in which a pulling-force generator arranged in the drilling device, expanding device or pull-in device exerts a compressive force on a pipe conduit, to be pulled in, via a pulling means and an adapter and thereby holds the individual short pipes of the pipe conduit together and reduces the mechanical stress to which the short pipes are subjected.

20 Claims, 1 Drawing Sheet

U.S. PATENT DOCUMENTS

| | | | |
|---|---|---|---|
| 4,720,211 A | | 1/1988 | Streatfield et al. |
| 4,925,344 A | * | 5/1990 | Peres et al. ............... 405/184.3 |
| 5,013,188 A | * | 5/1991 | Campbell et al. ......... 405/184.1 |
| 5,403,122 A | * | 4/1995 | Granella ................... 405/184.3 |
| 5,785,458 A | * | 7/1998 | Handford ................. 405/184.3 |
| 6,357,967 B1 | * | 3/2002 | Putnam .................... 405/184.3 |
| 6,443,658 B1 | * | 9/2002 | Lincoln .................... 405/184.1 |
| 6,491,476 B2 | * | 12/2002 | Hesse ...................... 405/184.2 |
| 6,588,983 B1 | * | 7/2003 | Tenbusch, II ............ 405/184.3 |
| 6,854,932 B2 | * | 2/2005 | Putnam .................... 405/184.3 |
| 2006/0088384 A1 | * | 4/2006 | Putnam .................... 405/184.1 |

FOREIGN PATENT DOCUMENTS

| | | |
|---|---|---|
| DE | 196 08 056 C | 10/1997 |
| DE | 101 25 848 A1 | 1/2003 |
| EP | 0 860 638 A | 8/1998 |
| GB | 2 164 718 A | 3/1986 |

OTHER PUBLICATIONS

"Tiefbau Ingenieurbau Strassenbau" [*Underground Construction Civil Engeering Road Construction*], bau verlag, t i s, Jun. 2004, p. 36,37.

UmweltBau—"Das Fachmagazin für Leitungsbau / Umwelttechnik / Tiefbau"[*Journal for Line Construction / Environment / Underground Construction*], bauwirtschaftliche Informationen, No. 3, Jun. 2004, pp. 57,58.

\* cited by examiner

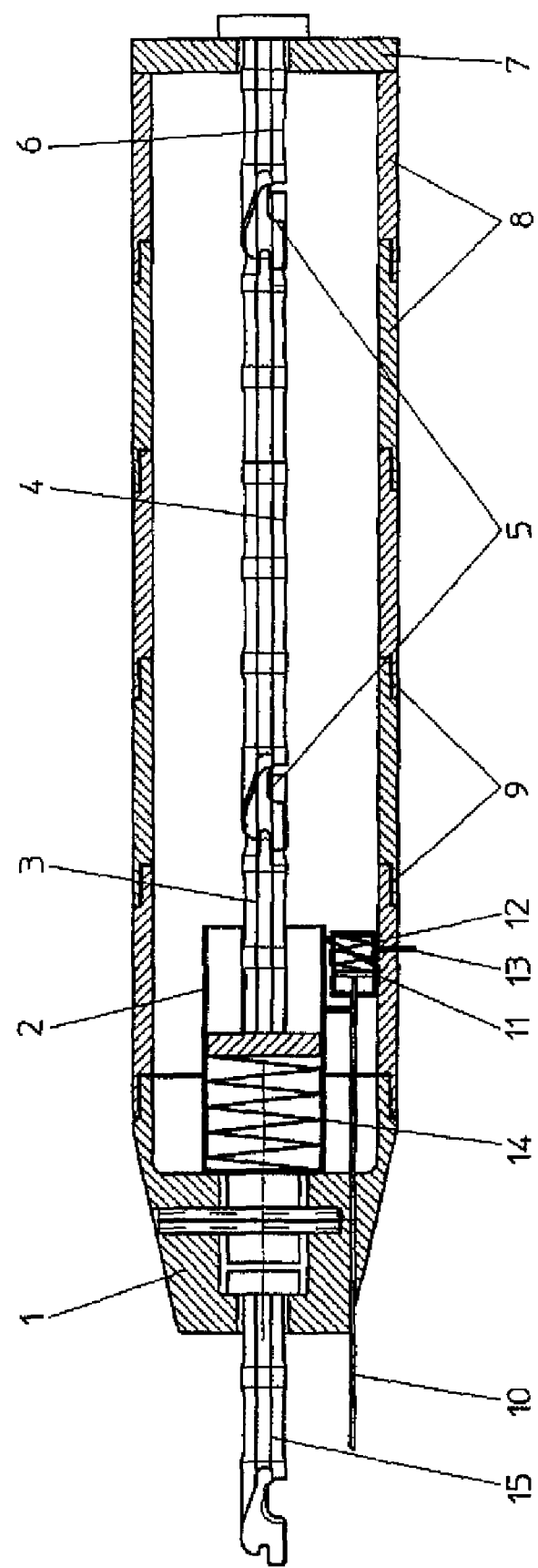

APPARATUS AND METHOD FOR JOINING A PIPE CONDUIT TO A DRILLING DEVICE, EXPANDING DEVICE OR PULL-IN DEVICE

BACKGROUND OF THE INVENTION

The invention relates to an apparatus and a method for joining a pipe conduit to a drilling device, expanding device or pull-in device or the like.

During trenchless pipe laying, new pipes are pulled into a bore in the soil. The bore may be a new bore produced during the pulling-in or an already existing pilot bore which is widened to the desired diameter by an expanding device. Furthermore, expanding devices—what are referred to as bursting devices—are used in order to destroy a laid old line and to pull in a new line in its place.

The new pipes to be laid are often joined directly to the advanced tool, so that the bore is produced or widened and the new pipe pulled in in one operation.

New pipes are very often laid from a starting shaft. Since there is a very restricted space in such a shaft, new pipe conduits which consist of individual short pipes and are pulled in one after the other are mainly used.

The pulling force which is produced by the leading tool in combination with the shell friction between the components and the earth leads to a tensile stress in the new pipe. The result of this is that a new pipe conduit consisting of such individual short pipes is pulled apart or an individual, long new pipe is stretched to a considerable degree.

It is therefore known from DE 196 08 056 C1 to connect the tool to an adapter at the end of the pipe conduit to be drawn in via a tensile pulling means in the form of a cable. This ensures that the pulling force of the tool is transmitted via the cable to the adapter, so that the pipe conduit is pushed together between tool and adapter.

As a result, the short pipes are fitted together more reliably and the stress to which the pipes are subjected is low.

Used in DE 196 08 056 C1 in order to tension the cable is a tensioning device which is supported on the adapter and shortens the cable via a hydraulic cylinder. Since the end of the last pipe is located inside the starting pit, the tensioning device must consequently also be arranged in this pit.

If the pipe has been drawn in over the length of a short pipe, a further short pipe has to be integrated in the combination. To this end, the tensioning device is released, the further short pipe is slipped onto the cable, the adapter is fastened to the rear end of the further short pipe, and the cable is shortened again. This procedure is extremely labor-intensive and time-consuming. In addition, the tensioning device, which is large and heavy on account of the forces to be applied, must be displaced inside the starting pit every time by at least the length of the short pipe.

SUMMARY OF THE INVENTION

The object of the invention is to provide an apparatus and a method for joining a pipe conduit to a drilling device, expanding device or pull-in device or the like, which apparatus avoids at least one of the disadvantages known from the prior art.

This object is achieved by an apparatus for joining a pipe conduit to a drilling device, expanding device or pull-in device, having a pulling-force generator and a pulling means connected to a part of the pipe conduit, wherein the pulling-force generator is arranged in the drilling device, expanding device or pull-in device.

The invention provides for the pulling-force generator, which is responsible for the tensioning of the pulling means, to be arranged in the drilling device, expanding device or pull-in device.

In this way, in order to lengthen the pipe conduit by a further short pipe, it is merely necessary to relieve the pulling means and fasten the adapter, to which the pulling means is fastened, to the new short pipe. A movement of the pulling-force generator during the coupling operation can be dispensed with in this case.

In an advantageous configuration of the invention, the pulling-force generator used is a fluid cylinder, which generates a corresponding pulling force by supplying a pressure fluid. As an alternative to the fluid cylinder, other types of pulling-force generator, in particular with an electric-motor-operated or electromagnetic drive, may also be used. A combination of different or identical drive types making up a pulling-force generator combination is also possible.

The pulling means is advantageously designed in the form of a rod string. By attaching further rod sections to the existing rod string, the latter can be connected to a further short pipe in accordance with the lengthening of the pipe conduit. As a result, it is not necessary for the pulling means to be moved up, starting from the pulling-force generator, as would be the case when using a cable for example.

In an especially advantageous configuration, the bending and torsional strength of such a rod string is used, and quick-action fasteners are used for joining individual components of the string. The use of quick-action couplings is appropriate in particular for joining the rod sections to one another and for joining the first and the last rod section to the drilling device, expanding device or pull-in device and respectively to the moving-up adapter.

All embodiments of quick-action couplings may be used. Said quick-action couplings should be able to transmit pulling forces and should at the same time be capable of being connected as simply and as quickly as possible and without the use of auxiliary means.

However, the apparatus according to the invention is not to be restricted to the use of a pulling rod. Other types of pulling means, in particular cables and chains, may likewise be used, which, for example, are moved up starting from the pulling-force generator or are lengthened by the attachment of further pieces. Chains in particular can be lengthened in a simple and quick manner by latching an extension piece in position.

In a further advantageous configuration, one or more outlets for directing a fluid into the immediate environment of the apparatus may be provided. This is especially advantageous when the drive fluid used for the fluid cylinder is a fluid which is directed partly through the outlet into the immediate environment. The fluid may serve to reduce the shell friction and to this end may have certain friction-reducing properties, which can also be produced by supplying additives.

In particular bentonite or water/polymer mixtures are suitable for this use, since they have good lubricating properties and are sufficiently environmentally compatible.

In an especially advantageous manner, the outlet is arranged in the region of the drilling device, expanding device or pull-in device in order to direct the fluid into the intermediate space between pipe shell and earth.

Uniform distribution of the fluid in the intermediate space can be achieved by the arrangement of a plurality of outlets on the respective housing circumference.

One or more pressure relief valves may be advantageously arranged in the fluid feed of the fluid cylinder. As a result, overloading of components of the system as a result of an excessive fluid pressure can be prevented.

Furthermore, a drain of the pressure relief valve can be connected to the outlet or outlets for directing the fluid into the immediate environment of the apparatus. Such a configuration can be used merely to enable the apparatus to tension the pulling means when applying a pressure up to a certain pressure limit value. On the other hand, if the pressure is increased above the pressure limit, the pressure relief valve opens and discharges some of the fluid flow to the outlet/outlets. The pressure inside the fluid cylinder can be kept constant starting from this pressure limit. This enables the apparatus to always tension the pulling means when a system pressure is applied and enables the fluid to be directed into the environment by an increase in the system pressure above the pressure limit. A pronounced increase in the system pressure merely leads to a high volumetric flow through the outlet or outlets, but damage to the tensioning components or the pipe is prevented by the pressure relief valve.

In a further advantageous configuration of the invention, the fluid feed for the fluid cylinder is laid outside the internal volume of the pipe conduit. This prevents a situation in which the additional short pipes of the pipe conduit have to be slipped onto the fluid feed.

It is advantageous if the fluid feed is directed to the apparatus starting from the target shaft of the operation. This can be achieved in an especially advantageous manner by integration of the fluid feed in a pushing/pulling element which is provided for the advance of the drilling device, expanding device or pull-in device.

However, it is also possible to direct the fluid feed inside the new pipe to be laid, in particular inside the pulling means or in the intermediate space between pipe and earth.

BRIEF DESCRIPTION OF THE DRAWING

The invention is explained in more detail below with reference to an exemplary embodiment shown in the sole FIGURE which is a schematic, sectional view of an apparatus for joining a pipe conduit to a drilling device, expanding device or pull-in device, in accordance with the present invention.

DETAILED DESCRIPTION OF PREFERRED EMBODIMENTS

The drawing shows a system consisting of a tool head 1 having a hydraulic cylinder 2 fastened thereto, which works as a pulling-force generator. The hydraulic cylinder 2 transmits in its pulling stage a pulling force to a pulling rod which is connected to the piston 3 and consists of individual rod sections 4 which are connected to one another via quick-action couplings 5.

An adapter piece 15 of a drive rod is arranged at the front end of the tool head 1. The unit consisting of tool head with attached pipe conduit is moved through the old pipeline with the aid of the drive rod.

Provided as final element of the pulling rod is an adapter rod 6 which exerts a compressive force on the pipe conduit via a thrust plate 7. As a result, the individual short pipes 8 of the pipe conduit are reliably held together in their sockets 9.

A pressure relief valve 11 is fitted in the fluid feed 10 which supplies the hydraulic cylinder 2 with pressure fluid. A drain 12 of the pressure relief valve 11 leads to an outlet in the shell of the first short pipe.

The pressure relief valve is designed in such a way that the pressure fluid is used exclusively for supplying the hydraulic cylinder 2 up to a certain pressure limit value. If the limit value is exceeded, the pressure relief valve 11 opens and some of the fluid flow is directed via the drain 12 and the outlet 13 into the environment.

The fluid feed 10 is directed from the front (in the direction of movement) to the hydraulic cylinder. As a result, during extension of the pipe conduit by an additional short pipe 8, the latter does not have to be slipped onto the fluid feed. On the other hand, if the fluid feed were to be guided outside between the shell of the short pipes and the earth, the frictional resistance of the movement of the pipe conduit would increase and the fluid feed would become worn.

In order to integrate a further short pipe 8 in the pipe conduit, first of all the working pressure in the hydraulic cylinder 2 is now reduced until the spring force of the return spring 14 exceeds the compressive force of the piston 3. The pulling rod is therefore relieved and the adapter rod 6 can be removed together with the thrust plate 7. After that, a further short pipe 8 is added to the pipe conduit and the rod string is supplemented by a further rod section 4 or a lengthened adapter rod 6.

In the present exemplary embodiment, a single-acting cylinder 2 is used, which works against the force of a return spring 14. It is equally possible to use a double-acting cylinder or two cylinders working in opposition.

What is claimed is:

1. Apparatus for joining a pipe conduit to a tool head, said apparatus comprising:
    a tool head butting against a front end of the pipe conduit;
    a pulling-force generator in the form of a fluid cylinder for producing a pulling force, said pulling-force generator being connected to the tool head; and
    a force-transmitting assembly connected to the pulling force generator and to a rear end of the pipe conduit for transmitting the pulling force upon the pipe conduit,
    wherein the pulling-force generator is arranged at a front end of the force-transmitting assembly in proximity of the tool head,
    wherein the pulling-force generator includes a fluid feed for supply of fluid to the fluid cylinder, and further comprising at least one fluid outlet for directing fluid into an immediate environment of the apparatus, when a pressure in the fluid cylinder exceeds an upper limit value.

2. The apparatus of claim 1, wherein the force-transmitting assembly is constructed in the form of a string of individual rods.

3. The apparatus of claim 1, further comprising a pressure relief valve disposed in the fluid feed of the fluid cylinder.

4. The apparatus of claim 3, wherein the pressure relief valve has a drain which is fluidly connected to the fluid outlet for directing fluid into the immediate environment of the apparatus.

5. The apparatus of claim 1, wherein a fluid feed for the fluid cylinder is arranged inside the pipe conduit.

6. The apparatus of claim 5, wherein the fluid feed is integrated in the force-transmitting assembly.

7. The apparatus of claim 1, wherein the tool head is a member selected from the group consisting of drilling device, expanding device and pull-in device.

8. The apparatus of claim 1, wherein the individual rods are connected to one another by positive-locking quick-action fasteners.

9. Apparatus for joining a pipe conduit to a tool head, said apparatus comprising:
- a tool head butting against a front end of the pipe conduit
- a pulling-force generator in the form of a fluid cylinder for producing a pulling force, said pulling-force generator being connected to the tool head; and
- a force-transmitting assembly connected to the pulling force generator and to a rear end of the pipe conduit for transmitting the pulling force upon the pipe conduit,
- wherein the pulling-force generator is arranged at a front end of the force-transmitting assembly in proximity of the tool head,
- wherein a fluid feed for the fluid cylinder extends outside an internal volume of the pipe conduit.

10. The apparatus of claim 9, further comprising a pushing/pulling element for advance of the tool head, wherein the fluid feed is integrated in the pushing/pulling element.

11. The apparatus of claim 9, wherein a fluid feed for the fluid cylinder is arranged inside the pipe conduit.

12. The apparatus of claim 11, wherein the fluid feed is integrated in the force-transmitting assembly.

13. The apparatus of claim 9, wherein the tool head is a member selected from the group consisting of drilling device, expanding device and pull-in device.

14. The apparatus of claim 9, wherein the force-transmitting assembly is constructed in the form of a string of individual rods.

15. The apparatus of claim 9, wherein the individual rods are connected to one another by positive-locking quick-action fasteners.

16. A method of joining a pipe conduit to a tool head, said method comprising the steps of:
- butting the tool head against a front end of the pipe conduit;
- connecting a force-transmitting assembly to a rear end of the pipe conduit and to a pulling-force generator which is placed at a front end of the force-transmitting assembly in proximity of the tool head;
- generating a pulling force by the pulling-force generator for joining the pipe conduit to the tool head; and
- directing a fluid into an immediate environment of the tool head, wherein the fluid is used for realizing the generating step and for reducing a surface friction when being directed into the immediate environment.

17. Apparatus for joining a pipe conduit to a tool head, said apparatus comprising:
- a tool head butting against a front end of the pipe conduit;
- a pulling-force generator for producing a pulling force, said pulling-force generator being connected to the tool head; and
- a force-transmitting assembly connected to the pulling force generator and to a rear end of the pipe conduit for transmitting the pulling force upon the pipe conduit, said force-transmitting assembly constructed in the form of a string of individual rods,
- wherein the pulling-force generator is arranged at a front end of the force-transmitting assembly in proximity of the tool head,
- wherein the pulling-force generator includes a piston connected to a forwardmost one of the individual rods by a positive-locking quick-action fastener.

18. The apparatus of claim 17, wherein the pulling-force generator is a fluid cylinder.

19. The apparatus of claim 17, wherein the individual rods are connected to one another by positive-locking quick-action fasteners.

20. The apparatus of claim 17, wherein the force-transmitting assembly includes an adapter connectable to a rearmost one of the individual rods by a positive-locking quick-action fastener.

* * * * *